United States Patent
Lee et al.

(10) Patent No.: US 8,493,758 B2
(45) Date of Patent: Jul. 23, 2013

(54) METHOD AND APPARATUS FOR GENERATING CURRENT COMMAND VALUE FOR TRACKING MAXIMUM POWER POINT IN SOLAR ENERGY GENERATING SYSTEM

(75) Inventors: Tae Won Lee, Gyunggi-do (KR); Yong Hyok Ji, Gyunggi-do (KR); Chung Yuen Won, Gyunggi-do (KR); Don Sik Kim, Gyunggi-do (KR); Doo Young Song, Gyunggi-do (KR); Min Ho Heo, Gwangju (KR); Jin Wook Kim, Seoul (KR); Tae Hoon Kim, Gyunggi-do (KR); Young Ho Kim, Gyunggi-do (KR)

(73) Assignees: Samsung Electro-Mechanics Co., Ltd., Gyunggi-Do (KR); Research & Business Foundation Sungkyunkwan University, Gyunggi-Do (KR)

( * ) Notice: Subject to any disclaimer, the term of this patent is extended or adjusted under 35 U.S.C. 154(b) by 71 days.

(21) Appl. No.: 13/291,630

(22) Filed: Nov. 8, 2011

(65) Prior Publication Data
US 2012/0170320 A1    Jul. 5, 2012

(30) Foreign Application Priority Data
Dec. 21, 2010 (KR) .......................... 10-2010-0131617

(51) Int. Cl.
*H02M 7/44* (2006.01)
(52) U.S. Cl.
USPC ............................................. 363/97; 323/906
(58) Field of Classification Search
USPC . 363/16, 20, 21.01, 35, 37, 95, 131; 323/299, 323/303, 906; 307/72, 82; 320/140
See application file for complete search history.

(56) References Cited

U.S. PATENT DOCUMENTS

| | | | | |
|---|---|---|---|---|
| 5,268,832 A * | 12/1993 | Kandatsu | | 363/95 |
| 5,625,539 A * | 4/1997 | Nakata et al. | | 363/17 |
| 5,644,219 A * | 7/1997 | Kurokawa | | 323/303 |
| 6,590,793 B1 * | 7/2003 | Nagao et al. | | 363/95 |
| 6,914,418 B2 * | 7/2005 | Sung | | 320/140 |
| 7,456,523 B2 * | 11/2008 | Kobayashi | | 307/82 |
| 8,009,446 B2 * | 8/2011 | Chou et al. | | 363/41 |
| 2008/0097675 A1 * | 4/2008 | Konishi et al. | | 701/75 |
| 2008/0169783 A1 * | 7/2008 | Yamamoto et al. | | 318/802 |
| 2010/0156185 A1 * | 6/2010 | Kim et al. | | 307/72 |
| 2011/0134669 A1 * | 6/2011 | Yuzurihara et al. | | 363/89 |

(Continued)

FOREIGN PATENT DOCUMENTS
KR    10-2007-0078524 A    8/2007

*Primary Examiner* — Adolf Berhane
(74) *Attorney, Agent, or Firm* — Lowe Hauptman Ham & Berner, LLP

(57) ABSTRACT

There are provided a method and an apparatus for generating a current command value for tracking the maximum power point of a solar energy generating system. The apparatus includes: a voltage detector detecting a voltage input into the flyback power converter; a first calculator calculating an output power from the detected input voltage; a second calculator calculating a power variation based on the calculated output power and a voltage variation of the input voltage; and a current command value generator generating a current command value for tracking the maximum power point of the solar cell module from the calculated voltage variation and the calculated power variation. Accordingly, a current command value after calculating an output power may be generated with only a voltage detector, without a current detector, thereby reducing the costs of a solar energy generating system by decreasing the costs for a high-priced current detector, and simplifying circuit.

10 Claims, 5 Drawing Sheets

U.S. PATENT DOCUMENTS

2011/0139213 A1* 6/2011 Lee .............................. 136/244
2011/0242857 A1* 10/2011 Kim et al. .................... 363/21.1
2012/0026758 A1* 2/2012 Lee et al. .................... 363/21.13
2012/0212191 A1* 8/2012 Yuzurihara et al. ........... 323/205

* cited by examiner

METHOD AND APPARATUS FOR GENERATING CURRENT COMMAND VALUE FOR TRACKING MAXIMUM POWER POINT IN SOLAR ENERGY GENERATING SYSTEM

CROSS-REFERENCE TO RELATED APPLICATIONS

This application claims the priority of Korean Patent Application No. 10-2010-0131617 filed on Dec. 21, 2010, in the Korean Intellectual Property Office, the disclosure of which is incorporated herein by reference.

BACKGROUND OF THE INVENTION

1. Field of the Invention

The present invention relates to a solar energy generating system, and more particularly, to a method and an apparatus for generating a current command value for tracking a maximum power point in the solar energy generating system.

2. Description of the Related Art

In general, a solar energy generating system is a system for converting light energy into electrical energy by using solar cells. FIG. 1 illustrates a general layout of a solar energy generating system, including a flyback converter. Referring to FIG. 1, power converters 20, such as flyback converters, are connected to solar cell modules 10, and a power grid 30 is connected to output terminals of the power converters 20.

As for the solar cell module 10 employed in this solar energy generating system, as shown in FIG. 2(a) and FIG. 2(b), the amount of maximum power generated and the generation conditions thereof (maximum power point 11) are varied, according to the amount of available solar radiation and ambient temperature. That is, as shown in FIG. 2(a), the maximum power point 11 of the solar cell module 10 rises with an increase in the amount of available solar radiation, and falls with an increase in ambient temperature. Therefore, the power converter 20 such as flyback converter should be designed to output the maxim available amount of power at all times, even when environmental conditions are varied.

In addition, the power converter 20 of the solar energy generating system of the related art needs a separate current detector for detecting current from the solar cell module 10 other than a voltage detector for detecting voltage of the solar cell module 10, in order to track the maximum power point of the solar cell module 10. This causes an increase in the total costs of the solar energy generating system and a complexity of the circuits thereof.

SUMMARY OF THE INVENTION

An aspect of the present invention provides a method and an apparatus for generating current command value for tracking a maximum power point of a solar energy generating system capable of reducing the costs of a solar energy generating system and simplifying the circuit.

According to an aspect of the present invention, there is provided an apparatus for generating a current command value for tracking the maximum power point of a solar energy generating system including a solar cell module and a flyback power converter for receiving a voltage from the solar cell module to output the received voltage as a grid voltage, the apparatus including: a voltage detector detecting a voltage input into the flyback power converter; a first calculator calculating a power output from the detected input voltage; a second calculator calculating a power variation based on the calculated output power and a voltage variation of the input voltage; and a current command value generator generating a current command value for tracking the maximum power point of the solar cell module from the calculated voltage variation and the calculated power variation.

The current command value generator may determine a position of an operating point on a maximum power point curve of the solar cell module from the calculated voltage variation and the calculated power variation, and generate the current command value for tracking the maximum power point based on the determined operating point.

The current command value generator may determine that the operating point exists to the left of the maximum power point on the maximum power point curve when both of the voltage variation and the power variation have positive values, and determine that the operating point exists to the right of the maximum power point on the maximum power point curve when either of the voltage variation and the power variation has a negative value.

The current command value generator may generate the current command value by deducting a predetermined value from the existing current command value when the operating point exists to the left of the maximum power point and by adding a predetermined value to the existing current command value when the operating point exists to the right of the maximum power point.

The first calculator may calculate the output power by the following equation:

$$P_o = \frac{V_G^2 V_{PV}^2}{4L_m f_{min}(1 - \omega^2 L_f C_f)(nV_{PV} + V_G)^2}$$

wherein, $V_G$ denotes a maximum value of a grid voltage in the power grid connected to an output terminal of the flyback power converter, $V_{PV}$ denotes a maximum value of the input voltage, $L_m$ denotes a magnetizing inductance of a transformer included in the flyback power converter, $f_{min}$ denotes a minimum switching frequency, $\omega$ denotes a switching frequency, $L_f$ denotes an output inductor of the flyback power converter, $C_f$ denotes an output capacitor of the flyback power converter, and n denotes a winding number ratio of the transformer included in the flyback power converter.

According to another aspect of the present invention, there is provided a method of generating a current command value for tracking a maximum power point of a solar energy generating system including a solar cell module and a flyback power converter for receiving a voltage from the solar cell module to output the received voltage as a grid voltage, the apparatus including: detecting an voltage input into the flyback power converter; calculating a power output from the detected input voltage; calculating a power variation based on the calculated output power and a voltage variation of the input voltage; and generating a current command value for tracking the maximum power point of the solar cell module from the calculated voltage variation and the calculated power variation.

The generating of the current command value may include: determining a position of an operating point on a maximum power point curve of the solar cell module from the calculated voltage variation and the calculated power variation; and generating the current command value for tracking the maximum power point based on the determined operating point.

The determining of the position of the operating point may include determining that the operating point exists to the left of the maximum power point on the maximum power point curve when both of the voltage variation and the power variation have positive values, and determining that the operating point exists to the right of the maximum power point on the maximum power point curve when either of the voltage variation and the power variation has a negative value.

The generating of the current command value may include generating the current command value by deducting a predetermined value from the existing current command value when the operating point exists to the left of the maximum power point and by adding a predetermined value to the existing current command value when the operating point exists to the right of the maximum power point.

The calculating of the output power may be performed by the following equation:

$$P_o = \frac{V_G^2 V_{PV}^2}{4L_m f_{min}(1 - \omega^2 L_f C_f)(nV_{PV} + V_G)^2}$$

wherein, $V_G$ denotes a maximum value of a grid voltage in the power grid connected to an output terminal of the flyback power converter, $V_{PV}$ denotes a maximum value of the input voltage, $L_m$ denotes a magnetizing inductance of a transformer included in the flyback power converter, $f_{min}$ denotes a minimum switching frequency, $\omega$ denotes a switching frequency, $L_f$ denotes an output inductor of the flyback power converter, $C_f$ denotes an output capacitor of the flyback power converter, and n denotes a winding number ratio of the transformer included in the flyback power converter.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
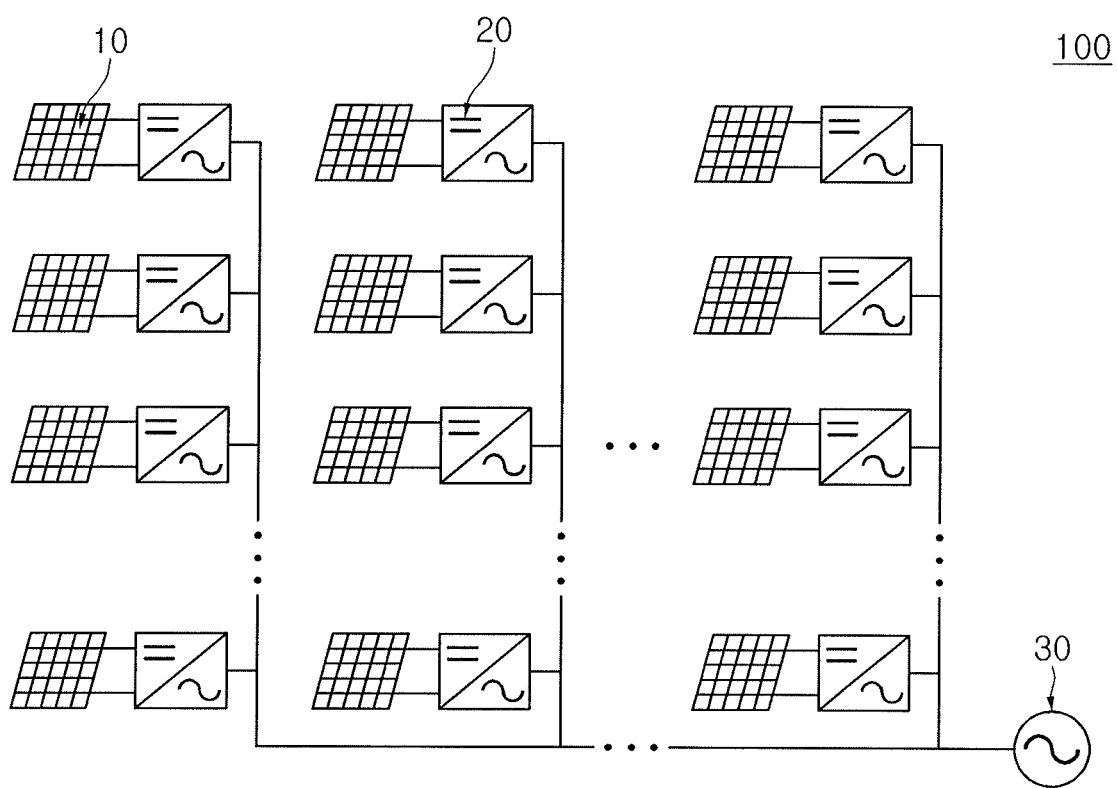
FIG. 1 shows a general lay out of a solar energy generating system including a flyback power converter.
Figure 2A:
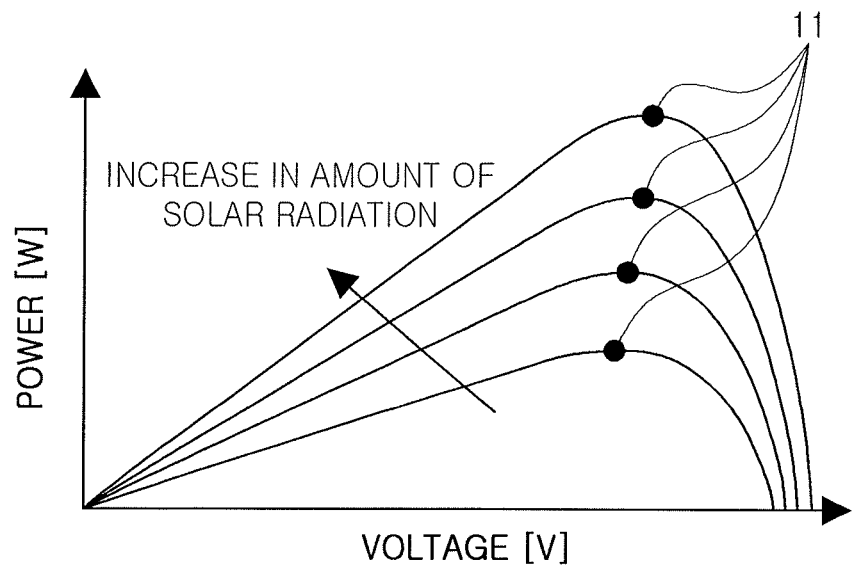
FIG. 2A and FIG. 2B show a variation characteristic of the maximum power point of a solar cell module used in a solar energy generating system.
Figure 2B:
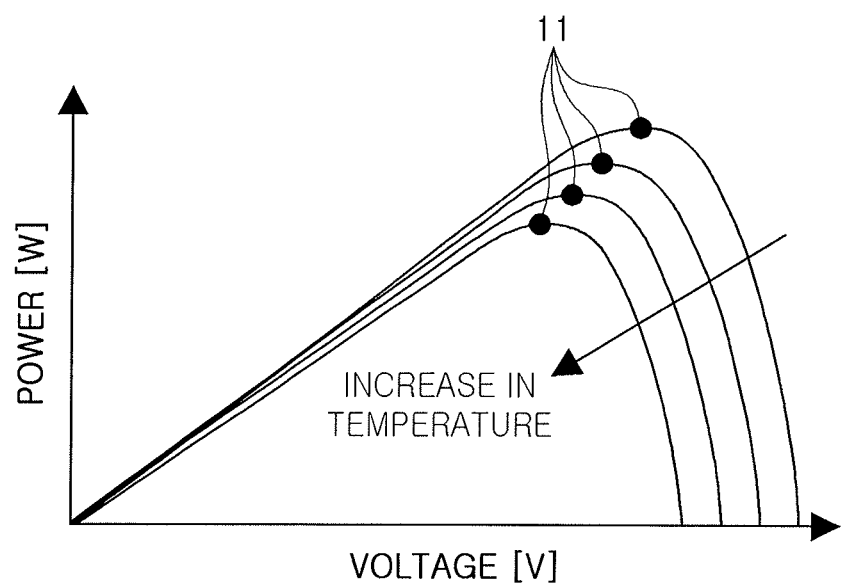

Exemplary embodiments of the present invention will now be described in detail with reference to the accompanying drawings so that they could be easily practiced by those skilled in the art to which the present invention pertains. However, in describing the exemplary embodiments of the present invention, detailed descriptions of well-known functions or constructions will be omitted so as not to obscure the description of the present invention with unnecessary detail.

In addition, like reference numerals denote like elements throughout the drawings.

Figure 3:
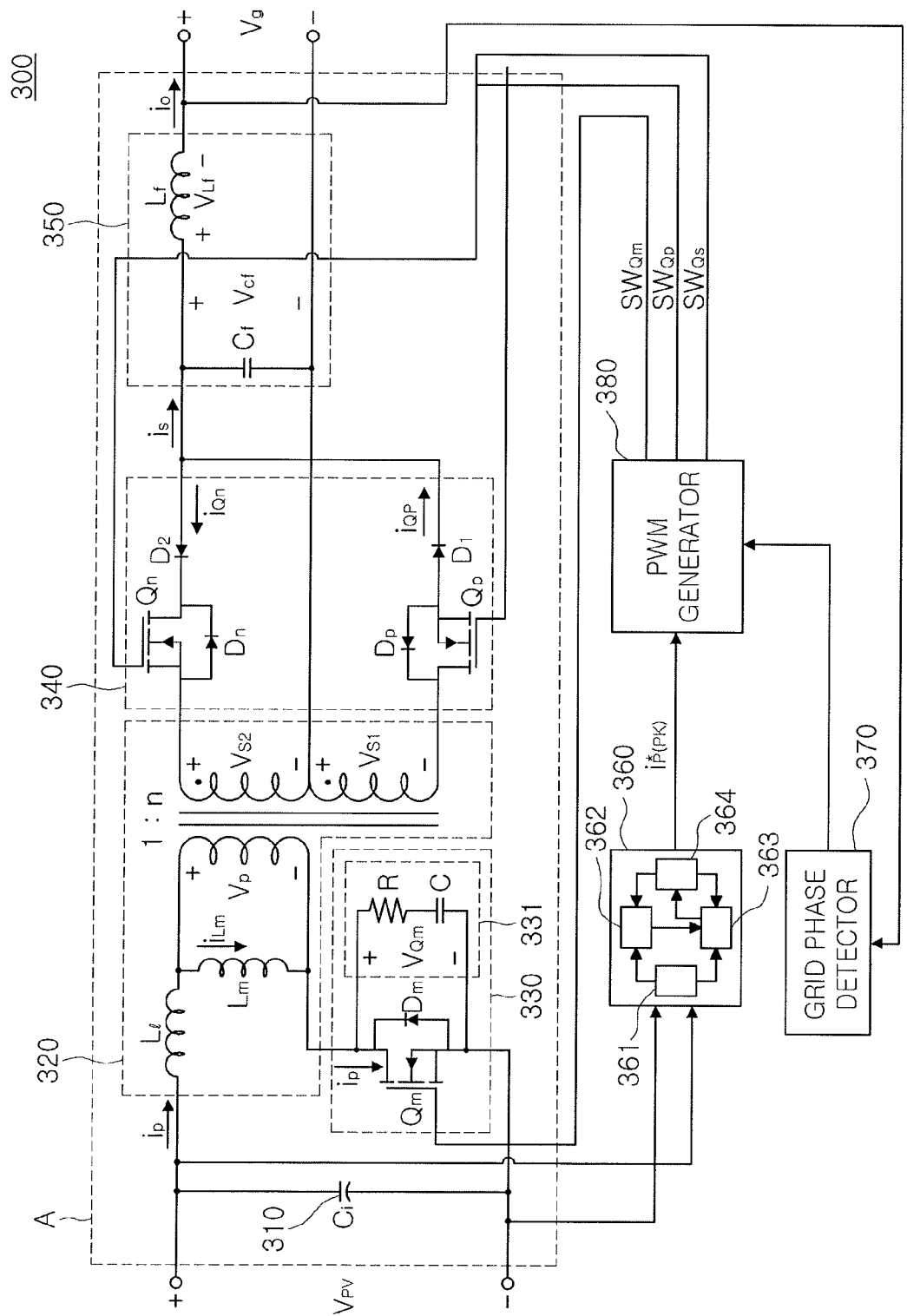
FIG. 3 is a block diagram of a solar energy generating system including a current command value generator according to one embodiment of the present invention.

FIG. 3 is a block diagram of a solar energy generating system including a current command value generator 360 according to an embodiment of the present invention. The solar energy generating system may include a flyback power converter A, a current command value generator 360, a grid phase detector 370, and a PWM generator 380.

First, in the flyback power converter A with reference to FIG. 3, the flyback power converter A may include an input capacitor bank 310, a main switch set 330, a high frequency transformer 320, a line switch set 340, and an output filter 350.

The input capacitor bank 310 of the flyback power converter A may be provided by connecting several capacitors in parallel in order to smooth an input voltage to be approximate to a direct current by removing voltage ripples.

The main switch set 330 of the flyback power converter A may include a main switch $Q_m$ and a snubber 331 for stabilizing a voltage of the main switch $Q_m$. The main switch $Q_m$ converts a DC output inputted from a solar cell module into an AC form by high-frequency switching (several tens of kHz to several hundreds of kHz), and then transmits the converted output to a secondary side of the transformer 820. The snubber 331 may be provided in several types, and for example, a most general RC snubber is displayed in FIG. 3. The RC snubber 331 may include a snubber resistor R and a snubber capacitor C. A voltage rating of the main switch $Q_m$ may be determined according to the capacity of the snubber capacitor C. The snubber resistor R may limit current at the discharging time of the snubber capacitor R.

The high frequency transformer 320 of the flyback power converter A may include three windings. A primary side is connected between a (+) terminal of the input capacitor bank 310 and the main switch set 330. A secondary side may be constituted in a center-tap type. In the secondary side, a center tap is connected to a neutral point of the power grid (see, 30 in FIG. 1), and the winding wire except the center tap may be connected to the line switch set 340.

The line switch set 340 of the flyback power converter A is switched in synchronization with frequency of the power grid (see, 30 in FIG. 1), and controls the direction of current such that an output current of the flyback power converter A has the same phase as the grid voltage. The line switch set 340 may include two switches $Q_p$ and $Q_n$ and two diodes D1 and D2. Current $i_{Qp}$ transmitted through the transformer 320 by switching of the main switch $Q_m$ flows to the output side through a forward AC switch $Q_p$ and a forward diode Dp, by electrically conducting the forward AC switch $Q_p$ during a positive half-period of the grid voltage and shutting off a reverse AC switch $Q_n$. A direction of current $i_{Qn}$ is changed by electrically conducting the reverse AC switch $Q_n$ and shutting off the forward AC switch $Q_p$ during a negative half-period of the grid voltage.

The output filter 350 of the flyback power converter A may include a filter capacitor $C_f$ and a filter inductor $L_f$. The output filter 350 may smooth a high frequency current, which is transmitted to the secondary side of the transformer 320 by switching of the main switch $Q_m$, to a low frequency (50 Hz to 60 Hz) current corresponding to the frequency of the grid voltage. In the present invention, since the output of the flyback power converter A is connected to the power grid 30 shown in FIG. 1, the output voltage of the flyback power converter A may be used in the same meaning as the grid voltage.

In regard to unexplained reference letters, $V_{cf}$ denotes a voltage of the filter capacitor $C_f$, $V_{Lf}$ denotes a voltage between both terminals of the filter inductor $L_f$, $i_o$ denotes an output current, $V_g$ denotes a grid voltage, $L_1$ denotes a leakage inductance of the transformer, $L_m$ denotes a magnetizing inductance of the transformer, $i_{Lm}$ denotes a magnetizing current of the transformer, $V_{Qm}$ denotes a voltage of the main switch $Q_m$, $V_{pv}$ denotes an input voltage, $i_p$ denotes a primary-side current, $V_p$ denotes a primary-side voltage of the transformer, and $V_{s1}$ and $V_{s2}$ denote secondary-side voltages of the transformer.

The grid phase detector 370 detects a phase of the output voltage of the flyback power converter A, i.e., the grid voltage, and transmits the detected phase of the grid voltage Vg to PWM generator 380.

The current command value generator 360 may include a voltage detector 361 for detecting the input voltage Vp of the flyback power converter A to transmit the detected input voltage $V_{PV}$ to a first calculator 362 and a second calculator 363, the first calculator 362 for calculating the output power from the input voltage $V_{PV}$ transmitted from the voltage detector 361 and transmitting the calculated output power to the second calculator 363, the second calculator 363 for calculating a power variation ΔP based on the output power transmitted from the first calculator 362 and a voltage variation ΔV of the input voltage transmitted from the voltage detector 361 and transmitting the calculated power variation ΔP and voltage variation ΔV to the current command value generator 364, and the current command value generator 364 for generating a current command value $i_p^*{}_{(pk)}$ for tracking a maximum power point of the solar cell module from the power variation ΔP and the voltage variation ΔV transmitted from the second calculator 363. The generated current command value $i_p^*{}_{(pk)}$ may be transmitted to the PWM generator 380.

Hereinafter, a procedure of calculating the output power from the input voltage $V_{PV}$ is described in more detail.

When the output current of the flyback power converter A is denoted as $i_o (= I_o \sin \omega t)$ and the grid voltage is denoted as $V_g (= V_o \sin \omega t)$, a one-period average output power of the grid voltage, $P_o$, may be represented by the following equation 1;

$$P_o = \frac{V_G I_o}{2} \qquad \text{Equation 1}$$

Meanwhile, the output current $i_o$ may be represented by the following equation 2:

$$i_o = \frac{2P_o}{V_G} \sin \omega t \qquad \text{Equation 2}$$

In addition, from the equation 2, the voltage $V_{Lf}$ between both ends of the filter inductor $L_f$ may be expressed by the following equation 3:

$$V_{Lf} = L_f \frac{di_o}{dt} = \frac{2\omega L_f P_o}{V_G} \cos \omega t \qquad \text{Equation 3}$$

The voltage $V_{Cf}$ between both ends of the filter capacitor $C_f$ may be expressed by the sum of the voltage $V_{Lf}$ between both ends of the filter inductor $L_f$ and the grid voltage $V_g$. The current $i_{Cf}$ flowing into the filter capacitor $C_f$ may be represented by the following equation 4:

$$i_{Cf} = C_f \frac{dv_{Cf}}{dt} = (\omega V_G C_f) \cos \omega t - \left(\frac{2\omega^2 P_o L_f C_f}{V_G}\right) \sin \omega t \qquad \text{Equation 4}$$

When an input terminal current of the output filter 350 is denoted as $i_s$, the input terminal current $i_s$ may be expressed by the sum of the output current $i_o$ and the current flowing into the filter capacitor $C_f$, as in the following equation 5:

$$i_S = i_o + i_{Cf} = (\omega V_G C_f) \cos \omega t + \frac{2P_o(1 - \omega^2 L_f C_f)}{V_G} \sin \omega t \qquad \text{Equation 5}$$

From the equation 5, a secondary-side peak current $i_{s(pk)}$ of the transformer 320 required every switching period may be represented by the following equation 6:

$$i_{S(pk)} = \frac{4P_o(1 - \omega^2 L_f C_f)}{V_G(1 - D_{pk})} \qquad \text{Equation 6}$$

wherein, $D_{pk}$ represents a maximum duty ratio of the main switch $Q_m$. The main switch $Q_m$ is controlled so that current flowing through the magnetizing inductance $L_m$ of the transformer 320 is operated in a boundary conduction mode (BCM).

Meanwhile, the duty ratio of the main switch $Q_m$ may be represented by the flowing equation 7:

$$D = \frac{V_g}{(nV_{pv} + v_g)} \qquad \text{Equation 7}$$

Accordingly, when the winding number ratio of the transformer 320 is noted as n, from the equations 6 and 7, a primary-side peak current $ip_{(pk)}$ of the transformer 320 may be represented by the following equation 8:

$$i_{p(pk)} = \frac{4P_o(1 - \omega^2 L_f C_f)(nV_{pv} + V_G)}{V_G V_{pv}} \qquad \text{Equation 8}$$

Meanwhile, a relation between the characteristics of the flyback power converter A, i.e., between the primary-side peak current $ip_{(pk)}$ and the magnetizing inductance $L_m$, a maximum duty ratio $D_{pk}$, a maximum value $V_{pv}$ of the input voltage, and a switching period T may be represented as follows:

$$i_{p(pk)} = \frac{V_{pv} D_{pk} T}{L_m} \qquad \text{Equation 9}$$

From equations 7, 8, and 9, the output power $P_o$ of the flyback power converter A may be represented as the following equation 10:

$$P_o = \frac{V_G^2 V_{pv}^2}{4 L_m f_{min}(1 - \omega^2 L_f C_f)(nV_{pv} + V_G)^2} \qquad \text{Equation 10}$$

Herein, it can be understood that the output power $P_o$ is calculable by only the input voltage $V_{pv}$ due to characteristic of the flyback power converter A, considering that all variables, other than the input voltage $V_{pv}$, are knowable values.

Meanwhile, the current command value generator 364 determines a position of an operating point on a maximum power point curve of the solar cell module from the voltage variation ΔV and the power variation ΔP, and generates a current command value $i_p{*}_{(pk)}$ for tracking the maximum power point based on the determined operating point. Particularly, the current command value generator 364 may determine that the operating point exists to the left of the maximum power point on the maximum power point curve when both of the voltage variation ΔV and the power variation ΔP have positive values, and determine that the operating point exists to the right of the maximum power point on the maximum power point curve when either of the voltage variation ΔV and the power variation ΔP has a negative value.

The current command value generator 364 generates the current command value $i_p{*}_{(pk)}$, by deducting a predetermined value from the existing current command value when the operating point exists to the left of the maximum power point and by adding a predetermined value to the existing current command value when the operating point exists to the right of the maximum power point. The relation between the voltage variation ΔV and the power variation ΔP as described above is shown in TABLE 1 below.

TABLE 1

| | ΔP > 0 | ΔP < 0 |
|---|---|---|
| ΔV > 0 | operating point being positioned on the left of the maximum power point | operating point being positioned on the right of the maximum power point |
| ΔV < 0 | operating point being positioned on the right of the maximum power point | operating point being positioned on the left of the maximum power point |

Further, the variation of the current command value according to a position of the operating point is shown in TABLE 2 below.

TABLE 2

| | ΔP > 0 | ΔP < 0 |
|---|---|---|
| ΔV > 0 | $(i_p{*}_{(pk)}) \downarrow$ | $(i_p{*}_{(pk)}) \uparrow$ |
| ΔV < 0 | $(i_p{*}_{(pk)}) \uparrow$ | $(i_p{*}_{(pk)}) \downarrow$ |

Meanwhile, the PWM generator 380 generates switching signals $SW_{Qm}$, $SW_{Qp}$ and $SW_{Qn}$ for controlling the main switch $Q_m$ and two pairs of line switches $Q_p$ and $Q_n$, from the current command value transmitted from the current command value generator 360 and the phase of grid voltage transmitted from the grid phase detector 370, and then controls the main switch $Q_m$ and the line switches $Q_p$ and $Q_n$ by the generated switching signals $SW_{Qm}$, $SW_{Qp}$ and $SW_{Qp}$. In the present invention, detailed description about the PWM generator 380 is omitted since detailed operation of the PWM generator 380 is away from the scope of the present invention.

Figure 4:
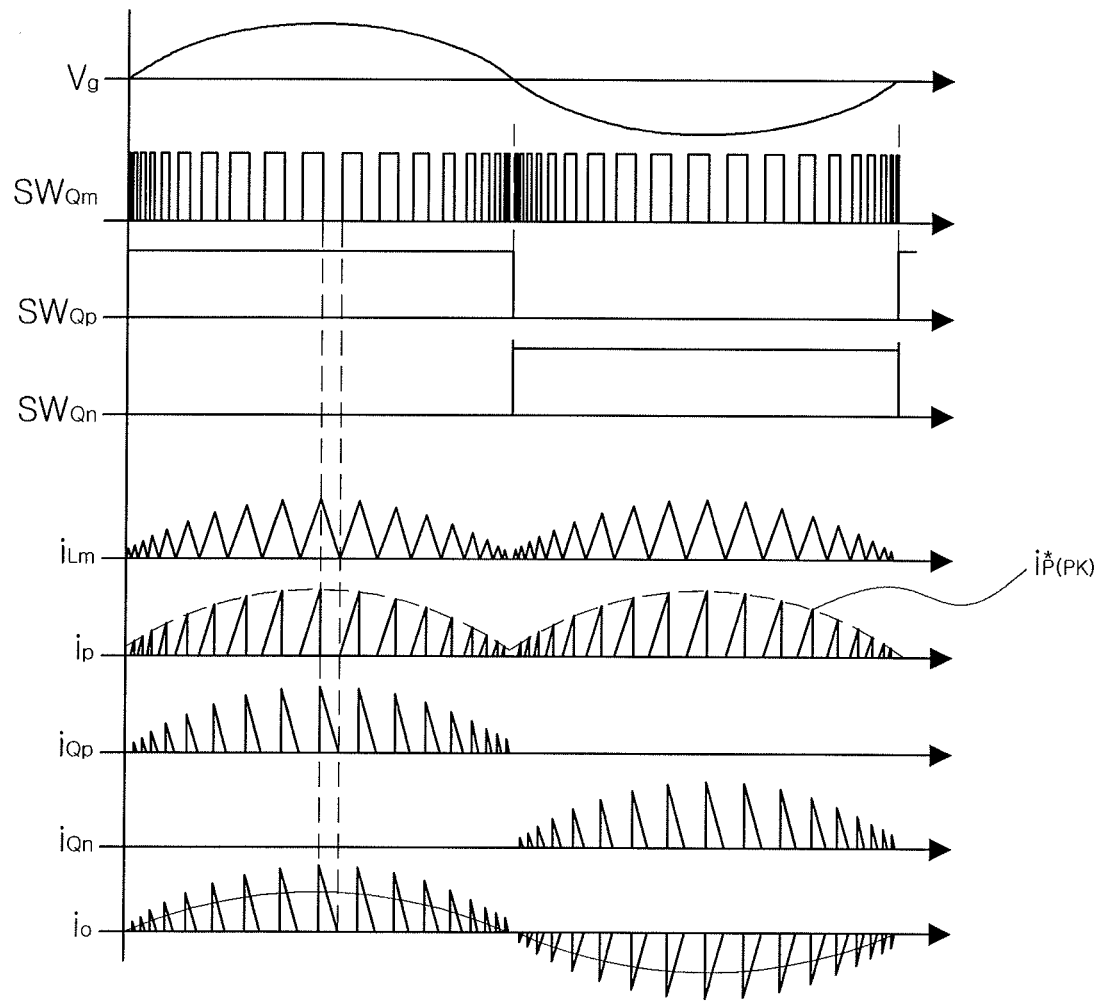
FIG. 4 shows waveforms of main parts of a flyback power converter controlled by a current command value generated according to an embodiment of the present invention.

FIG. 4 shows waveforms of main parts of a flyback power converter controlled by the current command value generated according to an embodiment of the present invention. In FIG. 4, $V_g$ denotes a grid voltage, $SW_{Qm}$ denotes a control signal of main switch $Q_m$, $SW_{Qp}$ and $SW_{Qn}$ denote control signals of line switches $Q_p$ and $Q_n$, $i_{Lm}$ denotes a current flowing through the magnetizing inductance $L_m$, $i_p$ denotes a current flowing through the primary side of the transformer 320, $i_{Qp}$ and $i_n$ denote currents flowing through the line switches $Q_p$ and $Q_n$ respectively, and $i_o$ denotes an output current.

Referring to FIG. 4, it is understood that the main switch $Q_m$ is turned off at the time when the primary-side current $i_p$ of the transformer 320 reaches the current command value $i_p{*}_{(pk)}$ generated by the current command value generator 360, and turned on at the time when the magnetizing current $i_{Lm}$ becomes zero.

Figure 5:
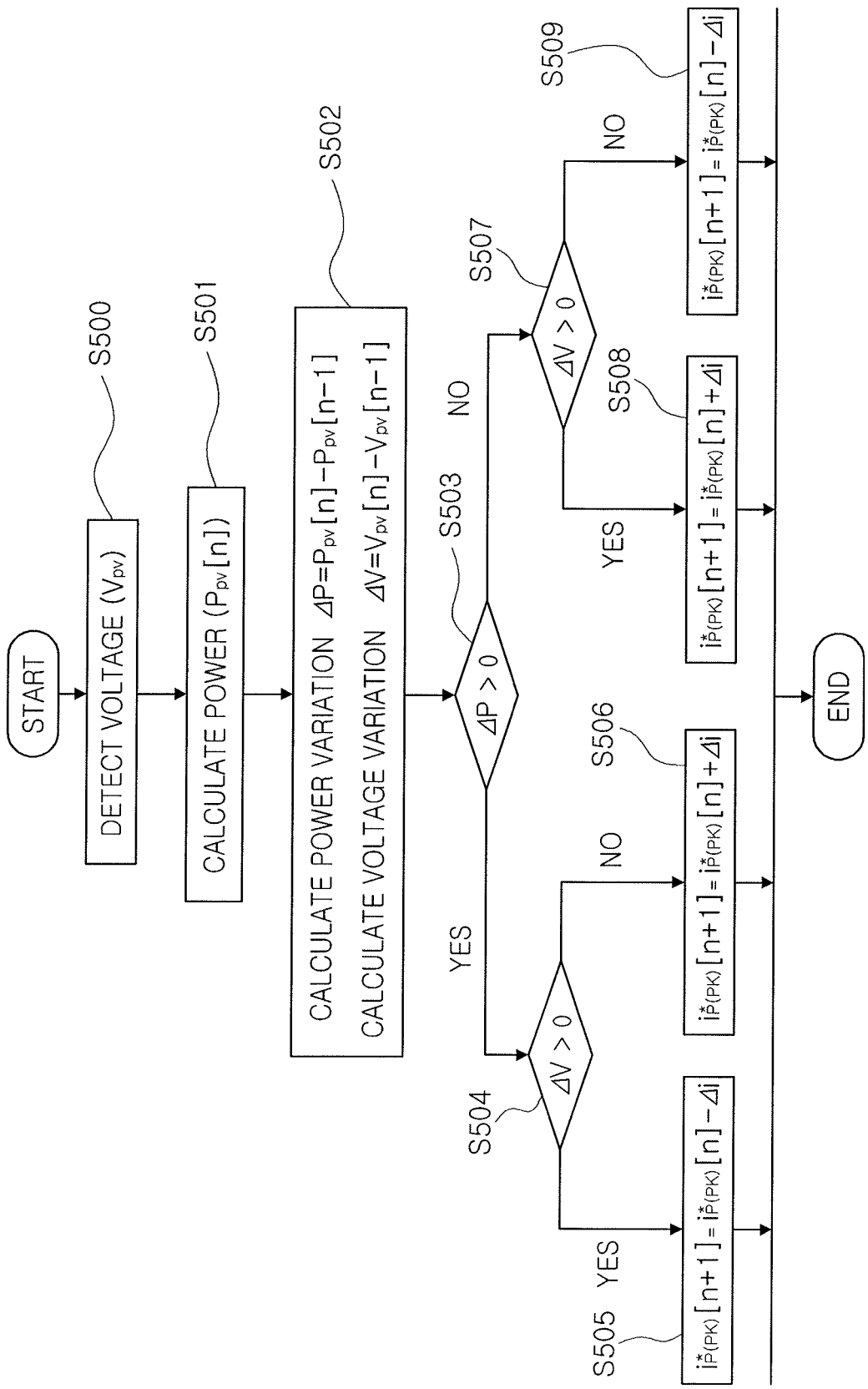
FIG. 5 is a flowchart for illustrating a method of generating a current command value according to an embodiment of the present invention.

Meanwhile, FIG. 5 is a flowchart for illustrating a method of generating a current command value according to an embodiment of the present invention.

Referring to FIG. 3 and FIG. 5, in operation 500, voltage detector 361 detects an input voltage $V_{pv}$ of flyback power converter A to transmit the detected input voltage to first calculator 362 and second calculator 364.

In operation 501, the first calculator 362 calculates an output power $P_{pv}[n]$ from the input voltage $V_{pv}$ transmitted from the voltage detector 361, and transmits the calculated output power $P_{pv}[n]$ to second calculator 363.

In operation 502, the second calculator 363 calculates a power variation ΔP based on the output power transmitted from the first calculator 362 and a voltage variation ΔV of the input voltage transmitted from the voltage detector 361, and then transmits the calculated power variation ΔP and voltage variation ΔV to current command value generator 364. Herein, the power variation ΔP is a value obtained by deducting the previous power $P_{pv}[n-1]$ from the current power $P_{pv}[n]$, and the voltage variation ΔV is a value obtained by deducting the previous voltage $V_{pv}[n-1]$ from the current voltage $V_{pv}[n]$.

In operation 503, the current command value generator 364 generates a current command value $i_p{*}_{(pk)}$ for tracking a maximum power point of solar cell module from the power variation ΔP and the voltage variation ΔV transmitted from the second calculator 363. Particularly, the current command value generator 364 determines the position of an operating point on a maximum power point curve of the solar cell module according to the voltage variation ΔV and the power variation ΔP, and generates the current command value $i_p{*}_{(pk)}$ according to the determined position of the operating point. This is described in more detail below.

In operation 503 and operation 504, the current command value generator 364 determines that the operating point is positioned on the left of the maximum power point on the maximum power point curve when both of the voltage variation ΔV and the power variation ΔP have positive values. Next, the process proceeds to operation 505.

In operation 505, the current command value generator 364 generates a new current command value $i_p{*}_{(pk)}[n+1]$ by deducting a predetermined value Δi from the previous current command value $i_p{*}_{(pk)}[n]$. The generated current command value $i_p{*}_{(pk)}[n+1]$ is transmitted to PWM generator 380.

Likewise, in operation 503 and operation 504, the current command value generator 364 determines that the operating point is positioned on the right of the maximum power point on the maximum power point curve when the power variation ΔP has a positive value and the voltage variation ΔV has a negative value. Next, the process proceeds to operation 506.

In operation 506, the current command value generator 364 generates a new current command value $i_p{*}_{(pk)}[n+1]$ by adding a predetermined value Δi to the previous current command value $i_p{*}_{(pk)}[n]$. The generated current command value $i_p{*}_{(pk)}[n+1]$ is transmitted to the PWM generator 380.

In operation 503 and operation 507, the current command value generator 364 determines that the operating point is positioned on the right of the maximum power point on the maximum power point curve when the power variation ΔP has a negative value and the voltage variation ΔV has a positive value. Next, the process proceeds to operation 508.

In operation 508, the current command value generator 364 generates a new current command value $i_p{*}_{(pk)}[n+1]$ by adding a predetermined value Δi to the previous current command value $i_p^*{}_{(pk)}[n]$. The generated current command value $i_p^*{}_{(pk)}[n+1]$ is transmitted to the PWM generator 380.

Likewise, in operation 503 and operation 507, the current command value generator 364 determines that the operating point is positioned on the left of the maximum power point on the maximum power point curve when both of the power variation ΔP and the voltage variation ΔV have negative values. Next, the process proceeds to operation 509.

In operation 509, the current command value generator 364 generates a new current command value $i_p^*{}_{(pk)}[n+1]$ by deducting a predetermined value Δi from the previous current command value $i_p^*{}_{(pk)}[n]$. The generated current command value $i_p^*{}_{(pk)}[n+1]$ is transmitted to the PWM generator 380.

As set forth above, according to embodiments of the present invention, a current command value may be generated after calculating an output power, with only a voltage detector without a current detector, by using characteristics of a flyback power converter. Further, the embodiment of the present invention is capable of reducing the costs of a solar energy generating system by decreasing the costs for a high-priced current detector, and capable of simplifying circuit.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for generating a current command value for tracking a maximum power point of a solar energy generating system including a solar cell module and a flyback power converter for receiving a voltage from the solar cell module to output the received voltage as a grid voltage, the apparatus comprising:
    a voltage detector detecting a voltage input into the flyback power converter;
    a first calculator calculating an output power from the detected input voltage;
    a second calculator calculating a power variation based on the calculated output power and a voltage variation of the input voltage; and
    a current command value generator generating a current command value for tracking the maximum power point of the solar cell module from the calculated voltage variation and the calculated power variation.

2. The apparatus of claim 1, wherein the current command value generator determines a position of an operating point on a maximum power point curve of the solar cell module from the calculated voltage variation and the calculated power variation, and generates the current command value for tracking the maximum power point based on the determined operating point.

3. The apparatus of claim 2, wherein the current command value generator determines that the operating point exists to the left of the maximum power point on the maximum power point curve when both of the voltage variation and the power variation have positive values, and determines that the operating point exists to the right of the maximum power point on the maximum power point curve when either of the voltage variation and the power variation has a negative value.

4. The apparatus of claim 3, wherein the current command value generator generates the current command value by deducting a predetermined value from the existing current command value when the operating point exists to the left of the maximum power point and by adding a predetermined value to the existing current command value when the operating point exists to the right of the maximum power point.

5. The apparatus of claim 1, wherein the first calculator calculates the output power by using the following equation:

$$P_O = \frac{V_G^2 V_{PV}^2}{4 L_m f_{min}(1 - \omega^2 L_f C_f)(nV_{PV} + V_G)^2}$$

wherein, $V_G$ denotes a maximum value of a grid voltage in a power grid connected to an output terminal of the flyback power converter, $V_{PV}$ denotes a maximum value of the input voltage, $L_m$ denotes a magnetizing inductance of a transformer included in the flyback power converter, $f_{min}$ denotes a minimum switching frequency, ω denotes a switching frequency, $L_f$ denotes an output inductor of the flyback power converter, $C_f$ denotes an output capacitor of the flyback power converter, and n denotes a winding number ratio of the transformer included in the flyback power converter.

6. A method of generating a current command value for tracking a maximum power point of a solar energy generating system including a solar cell module and a flyback power converter for receiving a voltage from the solar cell module to output the received voltage as a grid voltage, the method comprising:
    detecting a voltage input into the flyback power converter;
    calculating a power output from the detected input voltage;
    calculating a power variation based on the calculated output power and a voltage variation of the input voltage; and
    generating a current command value for tracking the maximum power point of the solar cell module from the calculated voltage variation and the calculated power variation.

7. The method of claim 6, wherein the generating of the current command value comprises:
    determining a position of an operating point on a maximum power point curve of the solar cell module from the calculated voltage variation and the calculated power variation; and
    generating the current command value for tracking the maximum power point based on the determined operating point.

8. The method of claim 7, wherein the determining of the position of the operating point comprises determining that the operating point exists to the left of the maximum power point on the maximum power point curve when both of the voltage variation and the power variation have positive values, and determining that the operating point exists to the right of the maximum power point on the maximum power point curve when either of the voltage variation and the power variation has a negative value.

9. The method of claim 8, wherein the generating of the current command value comprises generating the current command value by deducting a predetermined value from the existing current command value when the operating point exists to the left of the maximum power point and by adding a predetermined value to the existing current command value when the operating point exists to the right of the maximum power point.

10. The method of claim 6, wherein the calculating of the output power is performed by using the following equation:

$$P_O = \frac{V_G^2 V_{PV}^2}{4L_m f_{min}(1 - \omega^2 L_f C_f)(nV_{PV} + V_G)^2}$$

wherein, $V_G$ denotes a maximum value of a grid voltage in a power grid connected to an output terminal of the flyback power converter, $V_{PV}$ denotes a maximum value of the input voltage, $L_m$ denotes a magnetizing inductance of a transformer included in the flyback power converter, $f_{min}$ denotes a minimum switching frequency, $\omega$ denotes a switching frequency, $L_f$ denotes an output inductor of the flyback power converter, $C_f$ denotes an output capacitor of the flyback power converter, and n denotes a winding number ratio of the transformer included in the flyback power converter.

* * * * *